United States Patent Office 2,885,369
Patented May 5, 1959

2,885,369

CATALYST PREPARATION

John W. Teter, Chicago, Ill., and Carl D. Keith, Munster, Ind., assignors to Engelhard Industries, Inc., a corporation of New Jersey No Drawing. Application July 19, 1952
Serial No. 299,908

10 Claims. (Cl. 252—466)

Our invention relates to improvements in the production of alumina base reforming catalysts containing platinum or a platinum type metal active for hydrocarbon reforming.

In the production of alumina base reforming catalysts, various procedures have been described according to which an alumina hydrate is precipitated from an aqueous solution of a soluble aluminum compound, e.g. aluminum chloride, aluminum sulfate or sodium aluminate, by addition of ammonium hydroxide solution or, in the case of sodium aluminate solution, by ammonium chloride solution. The resulting slurry or precipitate of alumina hydrate then is washed to a low concentration of extraneous ions such as sodium, ammonium or chloride, and then the platinum metal is incorporated by addition as a water solution of a soluble or dispersible compound, e.g. chloroplatinic acid or rhodium chloride, which is then precipitated in situ by addition of hydrogen sulfide water. More recently, it has been found (see pending application Serial No. 288,058, filed May 15, 1952, now abandoned, by Teter, Gring and Keith) that transformation of the originally precipitated hydrous alumina from a predominant monohydrate type to a mixture of trihydrate types of alumina results in finished alumina base, platinum type metal catalysts of markedly improved properties with respect to catalyst activity, selectivity and aging stability.

We have now found that if the platinum metal is incorporated at a stage intermediate initial precipitation of the hydro-gel and its transformation to the desired mixture of trihydrate alumina forms for optimum catalysts, i.e. before the concentration of trihydrates exceeds about 50 percent and while the composition is in a state of change, a catalyst of particular aging stability is produced. Thus we have found that by adding the platinum metal to the alumina hydrate mixture either during washing or during the period of transformation to the trihydrate mixture more effective utilization of the platinum is obtained. Our experimental findings indicate that defect crystallite lattice structures in the alumina hydrate are the areas for greatest absorption of the catalyst agents such as platinum and its compounds, e.g. platinum oxide, platinum sulfide, chloroplatinic acid and the like. The availability of the defect lattices appears to be minimized with crystal growth which is a necessary incident of transformation from the monohydrate to the trihydrate alumina form. During the transformation, the crystallite size of the hydrate increases with a concomitant decrease in area available for adsorption.

Our invention, therefore, comprises formation of an alumina hydrate slurry by precipitation from an aqueous solution of a soluble aluminum compound, washing the alumina hydrate with water to reduce the concentration of extraneous ions to a low level, transforming the alumina hydrate to a mixture of hydrate phases predominating in alumina trihydrate but incorporating a platinum metal having reforming activity in the alumina hydrate at a point intermediate the initial precipitation and transformation to the desired concentration of alumina trihydrates. The preparation of the catalyst is completed by the usual drying, calcining and finishing steps. Our invention provides improved catalysts characterized by the presence of an adsorbed platinum metal incorporated in this manner. If desired an acidic promoter such as fluoride, sulfate, phosphate, silica, boria, chromia, molybdena and the like may be added before, approximately simultaneously with, or after the platinum metal incorporation.

In the application of our invention various aluminum compounds may be employed as starting materials. Aluminum chloride, however, is particularly advantageous and the desired alumina hydrate is readily precipitated from aqueous aluminum chloride by addition of aqueous ammonium hydroxide. The concentration of chloride should be reduced to about 0.5 percent or less by water washing. The hydrate slurry should be aged or otherwise transformed as by seeding with small crystallites of gibbsite, to a mixture of hydrate phases predominating in alumina trihydrates. Preferably the concentration of trihydrates should be between about 65 and 90 percent, with the balance consisting of boehmite+amorphous hydrated alumina.

Platinum is the metal of greatest interest in the preparation of reforming catalysts, but other platinum family metals which are characterized by a face centered cubic lattice structure are of value in the preparation of reforming or aromatic producing catalysts. Thus platinum, rhodium, iridium and palladium are of value. Platinum ordinarily is added in the form of chloroplatinic acid or as platinum sulfide (PtSx) while the other platinum metals are ordinarily handled as soluble salts such as the chloride. The catalytic metal may also comprise a mixture of the platium type metals or a mixture of a platinum type metal with another metal having catalytic activity useful in reforming, e.g. nickel, chromium or molybdenum.

Our invention will be illustrated in greater detail by reference to the following examples illustrating the preparation of typical catalysts.

I. PREPARATION OF THE ALUMINA HYDRATE

The alumina hydrate was precipitated by continuously adding (by syphon) 11.5 liters of 1NH$_4$OH:1H$_2$O to a vigorously stirred AlCl$_3$.6H$_2$O solution (15# of technical AlCl$_3$.6H$_2$O dissolved in 30.1 liters of deionized water) in a thirty gallon rubber lined tank fitted with a Lightning A.G. 100 Stirrer until the pH=8.0. The ammonium hydroxide solution was added at a rate of about 400 ml. per minute and the precipitation was completed in thirty minutes. The slurry thickened up at pH=4.5 to 5 (p Hydrion paper) and the ammonium hydroxide addition was discontinued for approximately 30 seconds until stirring became efficient. After the precipitation was completed, the slurry was stirred for thirty minutes and the hydrate was filtered from the mother liquor using a Sperry SS press coated with Tygon to minimize corrosion.

The hydrate was back washed for approximately sixteen hours with 70–80° F. deionized water. At this stage the filter cake (which was assigned number 400–F 9015) contained 7.85 percent Al$_2$O$_3$ and 10.78 percent Cl (based on Al$_2$O$_3$). An X-ray diffraction analysis of the dry cake (dried at 110° C.) indicated about 65 percent amorphous hydrous alumina+35 percent boehmite (quasi crystallize pattern intermediate stage).

II. ADDITION OF FLUORIDE AND PLATINUM

The above alumina hydrate 400–F 9015 was treated with ammonium fluoride and chloroplatinic acid solution in order to incorporate 0.75 percent fluoride and 0.35 percent platinum. To 15.2 kgs of alumina hydrate was added 17.55 grams of ammonium fluoride dissolved in 480 ml. of deionized water after thorough dispersion of the hydrate in 13 gallons of deionized water (pH=5.35). The ammonium fluoride solution was continuously added while vigorously stirring the alumina hydrate slurry over a six minute period. Stirring was continued for thirty minutes at which point the pH was 6.1. Chloroplatinic acid solution in the amount of 97.7 ml. (containing 0.043 g. Pt/ml.) was made up and diluted with 480 ml. of deionized water. The resulting chloroplatinic acid solution was continuously added to the alumina hydrate-fluoride slurry over a five minute period. Stirring was continued for five minutes, and while continuing to stir the resulting slurry, 975 ml. of deionized water saturated wtih hydrogen sulfide at 78° F. was slowly added. Stirring was continued for fifteen minutes at which point the slurry was dark brown and the pH was 5.9. While continuing to stir the resulting slurry, the pH was adjusted to 9.0 by slowly adding 600 ml. of $1NH_4OH:1H_2O$; continued to stir for fifteen minutes and filtered in Sperry press.

The filter cake was back washed about eighteen hours with 70 to 80° F. deionized water. The cake was then removed from the press and dispersed in 13 gallons of deionized water by stirring for one and one-half to two hours with caged beaters; pH=6.6. The pH of the slurry was adjusted to 9.0 by slowly adding 90 ml. of $1NH_4OH:1H_2O$; continued to stir for fifteen minutes and filtered in Sperry press. The filter cake was back washed about eighteen hours with 70 to 80° F. deionized water. The washed cake, which was assigned number 400–F 9020, contained 8.7 percent $Al_2O_3$ and 0.06 percent Cl (based on $Al_2O_3$). An X-ray diffraction analysis of 110° C. dry cake indicated 22 percent amorphous+33 percent boehmite+17 percent bayerite+8 percent randomite+20 percent gibbsite. The washed cake was used as the base for the catalyst described in Section III below.

III. PREPARATION OF CATALYST 400–F 9135

Washed $Al_2O_3 \cdot xH_2O$—F—Pt filter cake, 400–F 9020, was placed in a wax lined carton to convert to a hydrate composition predominating in alumina trihydrates. The hydrate composition by X-ray diffraction analysis contained after twenty-three days' aging from precipitation: 15 percent amorphous hydrous alumina, 8 percent boehmite, 25 percent bayerite, 15 percent randomite and 37 percent gibbsite. The aged alumina hydrate composition including fluoride and platinum was dried at 110° C., ground to pass 20 mesh, mixed with 2 percent Sterotex (hydrogenated vegetable oil) and was formed into 5/32-inch tablets. The Sterotex was burned out at 900° F., using five parts of air and 300 parts of nitrogen. The oxygen concentration was then slowly increased and finally the catalyst was calcined for six hours at 900° F. in straight air. The completed catalyst contained by analysis: 0.67 percent fluoride, 0.30 percent platinum and 0.09 percent chloride.

IV. ACTIVITY DATA AND AGING STABILITY

The following activity data were obtained at a pressure of 500 p.s.i.g., a space velocity of 4.4 WHSV, and a hydrogen to hydrocarbon ratio of $5H_2:HC$, utilizing a fed stock of the following characteristics.

*Feed stock characteristics*

| | |
|---|---|
| Gravity, °API | 51.5 |
| Initial boiling point, °F. | 252 |
| End point, °F. | 390 |
| Octane No. CFRR—neat | 37.3 |
| Paraffins, percent | 46.8 |
| Olefins, percent | 0.0 |
| Naphthenes, percent | 36.7 |
| Aromatics, percent | 16.5 |

| Test Temperature, °F. | Wt. Percent Stabilized Reformate | Wt. Percent Overhead | Research Method Octane No. (neat) |
|---|---|---|---|
| 870 | 89.0 | | 78.0 |
| 890 | 84.1 | | 85.2 |
| 910 | 80.8 | 3.4 | 90.6 |

The above catalyst 400–F 9135 was also aged under continuous processing conditions in comparison with a base line catalyst prepared in a similar manner except that the fluoride and platinum were incorporated after completion of the alumina hydrate preparation, washing and trihydrate transformation. The catalysts were evaluated using the same Mid-Continent virgin naphtha feed stock at 935° F. for the base line catalyst and 925° F. for catalyst 400–F 9135, 500 p.s.i.g., $10H_2:HC$ and 3 WHSV. The results of the aging test showed that the life of catalyst 400–F 9135 was about 25 percent longer than that of the base line catalyst in the 97 to 90 octane range (CFRR—neat). Over the test period of about 550 hours, the yield to octane relation of 400–F 9135 was substantially better while the net gas make (about 90 percent hydrogen) was also higher. These advantages indicate a significant superiority for the type catalyst of this invention, particularly since test catalyst 400–F 9135 contained 14 percent less platinum than the base line catalyst.

The application of the improved catalyst to hydrocarbon reforming may employ conventional process methods and reforming conditions. Thus the new catalysts may be formed into pills, tablets or pellets and handled in the form of a fixed bed through which the preheated hydrocarbon charge stock and reheated hydrogen separated from the tail gas are passed. The catalysts also may be prepared in finely divided form, particularly the compositions composed of platinum and alumina and handled in the form of a fluidized bed in the reaction zone. Provision may be made for periodic regeneration of the catalysts. The reaction temperature is generally within the range of about 850° to 1000° F. at a pressure of about 150 to 750 p.s.i.g. Space velocity of about 0.5 to 8 WHSV, with a hydrogen partial pressure of about 2:1 to 15:1 hydrogen to hydrocarbon ratio may be employed. For production of selected aromatics, a selected feed stock is prepared by appropriate prefractionation and the reaction conditions are appropriately modified in accordance with the particular reforming reaction involved.

We claim:

1. In the production of alumina base-platinum metal type reforming catalysts characterized by formation of an alumina hydrate slurry by precipitation from a water soluble aluminum salt, washing the hydrate slurry to a low concentration of extraneous ions, transforming the hydrate to a mixture of hydrate phases predominating in alumina trihydrates and drying and calcining the hydrate phases, the improvement which comprises incorporating the platinum metal in the hydrate mixture at a point subsequent to initial precipitation of the hydrate and prior to a transformation of said hydrate to a composition predominating in alumina trihydrate exceeding about 50 percent.

2. The method of claim 1 in which the platinum metal is incorporated at a point before completion of washing.

3. The method of claim 1 in which the platinum metal is incorporated after washing but before transformation to the desired trihydrate composition.

4. An alumina base-platinum type preforming catalyst produced by the method of claim 1.

5. The catalyst of claim 4 in which the metal is platinum.

6. The catalyst of claim 4 in which the metal is rhodium.

7. The catalyst of claim 4 in which the metal is iridium.

8. The catalyst of claim 4 in which the metal is palladium.

9. The catalyst of claim 4 in which the metal is a mixture of metals containing as an essential component a platinum type metal having reforming activity.

10. The catalyst of claim 5 which also contains an acidic promoter.

References Cited in the file of this patent
UNITED STATES PATENTS

| | | |
|---|---|---|
| 2,479,109 | Haensel | Aug. 16, 1949 |
| 2,483,782 | Pierce | Oct. 4, 1949 |
| 2,566,521 | Haensel | Sept. 4, 1951 |
| 2,667,461 | Guyer et al. | Jan. 26, 1954 |
| 2,689,226 | Hoekstra | Sept. 14, 1954 |